(12) United States Patent
Khachaturov et al.

(10) Patent No.: US 10,702,844 B2
(45) Date of Patent: Jul. 7, 2020

(54) LINEAR PERMANENT MAGNET MOTOR DRIVEN DOWNHOLE PLUNGER PUMPING UNIT

(71) Applicants: Dmytro Khachaturov, Kharkov (UA); Dmytro Nekrasov, Kharkov (UA); Vasyl Kryvonosov, Kharkov (UA); Maksym Pipich, Kharkov (UA)

(72) Inventors: Dmytro Khachaturov, Kharkov (UA); Dmytro Nekrasov, Kharkov (UA); Vasyl Kryvonosov, Kharkov (UA); Maksym Pipich, Kharkov (UA)

( * ) Notice: Subject to any disclaimer, the term of this patent is extended or adjusted under 35 U.S.C. 154(b) by 501 days.

(21) Appl. No.: 15/083,451

(22) Filed: Mar. 29, 2016

(65) Prior Publication Data

US 2017/0284177 A1    Oct. 5, 2017

(51) Int. Cl.
*E21B 43/12* (2006.01)
*B01J 19/00* (2006.01)
*B01J 3/00* (2006.01)
*B01F 3/00* (2006.01)

(52) U.S. Cl.
CPC ......... *B01J 19/0006* (2013.01); *B01F 3/0092* (2013.01); *B01J 3/008* (2013.01); *B01F 2003/0064* (2013.01); *B01J 2219/00051* (2013.01); *B01J 2219/00162* (2013.01);
(Continued)

(58) Field of Classification Search
CPC .... E21B 43/126; E21B 43/127; E21B 43/128; E21B 43/129; E21B 43/34; E21B 43/38; F04B 17/046; F04B 47/06; F04B 47/02; F04B 47/022; F04B 47/08; F04B 47/12
See application file for complete search history.

(56) References Cited

U.S. PATENT DOCUMENTS 5,049,046 A * 9/1991 Escue ............... E21B 43/128
166/66
5,179,306 A * 1/1993 Nasar ............... E21B 43/128
310/12.04
(Continued)

FOREIGN PATENT DOCUMENTS

RU         2521530 C2 *  6/2014

OTHER PUBLICATIONS

Machine translation of RU-2521530—Accessed 2018 (Year: 2018).*

*Primary Examiner* — David Carroll
(74) *Attorney, Agent, or Firm* — Nadya Reingand; Yan Hankin

(57) ABSTRACT

This invention is an oil-well pumping unit. It may be used for production of stratum fluids from marginal well stock at large depths. The invention increases reliability and improves power performance by including a fully integrated plunger pump fitted with discharge valves and a gravity gas separator, non-return valves, and a coupling for fastening the oil-well pumping unit to flow tubing. The downhole linear motor is mounted below the plunger pump. A slider upstroke damper and a slider down-stroke damper, as well as a telemetry unit, are mounted below the linear motor. The unit is linked to a ground-based control unit through a neutral wire interconnected with linear motor windings. The ground-based control unit may be designed as a three-phase high-frequency inverting controller and output transformer, and is connected to the downhole linear motor through an insulated three-wire cable.

11 Claims, 6 Drawing Sheets

(52) U.S. Cl.
 CPC ............... *B01J 2219/00164* (2013.01); *B01J 2219/00186* (2013.01)

(56) References Cited

U.S. PATENT DOCUMENTS

| | | | |
|---|---|---|---|
| 5,431,229 A * | 7/1995 | Christensen | F04B 9/06 166/105.2 |
| 5,708,337 A * | 1/1998 | Breit | E21B 43/128 318/400.09 |
| 2006/0233650 A1* | 10/2006 | Zhou | E21B 43/126 417/416 |
| 2015/0275870 A1* | 10/2015 | Van Dam | E21B 43/128 417/415 |

* cited by examiner

LINEAR PERMANENT MAGNET MOTOR DRIVEN DOWNHOLE PLUNGER PUMPING UNIT

FIELD OF INVENTION

This disclosure relates in general to well pumps and in particular to a reciprocating well pump operated by a downhole electrical motor.

BACKGROUND

A reciprocating well pump downhole motor (US20150176574) which includes the downhole plunger pump consisting of a fixed barrel and a moving plunger has been proposed. The downhole motor is mounted below the pump and connected with the plunger and causes the plunger to reciprocate. A valve arrangement mounted slightly below the plunger allows the oil-well fluid to flow into the barrel during the upstroke and into the chamber of the oil-well pump below the plunger during its down stroke.

It has previously been proposed to use an oil pumping unit (U.S. Pat. No. 7,316,270) driven by a linear synchronous three-phase motor with rare earth permanent magnets including a motor with the mover reciprocating when the motor is connected to the power mains, and a pump, which has a barrel with suction ducts for oil-well fluid passage and a valve, a movable valve and a piston, a bottom intake valve inside arranged in such a manner that when the mover is reciprocating, the oil-well fluid is being transferred in one direction.

It has previously been proposed to use a pumping unit (RU 2522347 C2) consisting of a downhole part which includes a pump and a linear permanent magnet downhole motor comprising the fixed part (stator) with the winding and the moving part inside (mover) designed so as to allow the mover to reciprocate with regard to stator, the motor housing is linked to the pump case, the mover is linked to the moving part of the pump, the control electronic unit with its power output connected to the stator winding; the control electronic unit comprises the ground-based and downhole units, the motor is fitted with the mover position sensor, the downhole telemetry unit is designed as an inverter in a tight enclosure with standard atmospheric pressure inside, the inverter enclosure is linked to the motor housing, the inverter output is connected to the power circuit and winding through cable glands, the output of position sensor elements is connected to the inverter control unit through additional cable glands and the ground-based unit is designed as series-connected input rectifier, single-phase high-frequency inverting controller and output rectifier.

The unit is characterized in that the high-frequency inverting controller may be designed for galvanic isolation between the output and input rectifier; the first pole of the ground-base unit power output may be connected to the first pole of the downhole inverter power circuit through an insulated cable; the second poles of the ground-based unit output and inverter power circuit are connected with the electrically coupled structural elements of the unit; the analogous poles of the ground-based unit output and downhole inverter power circuit may be connected through insulated two-wire cable; and the inverter control unit may comprise the mover step counter and be designed for reverse operation when the mover reaches the specified number of steps.

The drawback of this unit is a relatively poor reliability.

It has previously been proposed to use a downhole pumping unit (RU 2535288, C2) comprising the linear motor which includes the housing with the concentrically arranged fixed tight stator and a mover inside, the motor cavity formed by the stator, housing and mover is filled with the fluid and the mover is supported by the stator bearing members to provide for reciprocation along the stator longitudinal axis and a pump with the actuator linked to the mover and the fixed part is linked to the motor housing through structural elements designed for venting of the formed pump cavity as well as end plates between pump and motor cavities, arrangements for trapping mechanical impurities within the motor cavity and fine filters located axially in the motor housing between the stator and end plates with their exterior face tightly connected to the housing and the interior face contacts with the mover surface through arrangements for trapping mechanical impurities within the motor cavity.

This unit also lacks proper reliability.

A diaphragm pump downhole linear motor (CN101220806 A) has been also proposed. The downhole linear motor is attached to the diaphragm pump by hydraulic transmission. The invention is characterized in that it comprises the damper, pump piston, plastic expansion joint for the piston, permanent magnet rotor, stator of the linear permanent magnet motor and cylindrical housing. The upper part of the housing is linked to the diaphragm, the diaphragm cavity is divided into two chambers each fitted with an intake ball valve and a discharge ball valve, respectively; the internal cavity of the housing is filled with oil being a hydraulic fluid of the piston pump which has proper lubricating properties and provides proper sealing from the diaphragm to the expansion joint; the spring-loaded flexible assembly, piston pump, damper, rotor of the linear permanent magnet motor, stator of the linear permanent magnet motor and elastic expansion joints are mounted below the diaphragm.

The drawback of this engineering concept is a relatively poor reliability of the diaphragm and damper which is a compensator of the volume within the downhole linear motor during its operation and provides no impact protection in the extreme upper and lower points of the piston.

A reciprocating downhole pump with the gas separator located at its end (US20060002808 A1) has been proposed. The gas separator forms a cavity. The cavity has orifices for fluid passage during reciprocation of the pump plunger. The orifices are sized so as the fluid enters the pump intake while the gas is separated from the fluid in the formed cavity.

The drawback of this engineering concept is increased dimensions and weight of the unit due to external gas separator since the reciprocating downhole pump and the gas separator form two separate units.

A linear motor driven oilfield pump (US20080264625 A1) has been proposed. The linear motor moves the crankshaft or hydraulic gear for driving the pump plunger.

The drawback of this engineering concept is a poor bending resistance of the plunger since the plunger housing diameter is greater than that of the plunger and provides no plunger bending resistance.

It has previously been proposed to use a downhole pumping unit (U.S. Pat. No. 5,960,875 A) comprising an electric pump which includes the linear motor consisting of a stator (fixed part) and a mover (moving part) which can be moved under the effect of the electromagnetic field generated by the stator, a pump piston is moved inside the stator by the linear motor and characterized in that the motor mover and the piston are located inside the electric pump stator and form a single moving component of the linear motor.

The drawback of this unit is a relatively low power performance, great power losses due to large magnetic gap between magnetic sections of the mover and stator. This unit has a relatively low power since the magnetic sections of the mover are made of soft magnetic materials to provide for mover removal. The mounting of additional sensors such as intake pressure and temperature sensors and motor temperature sensors requires the supplementary communication lines of the ground-based unit.

The most technically similar concept to the proposed one is a unit (RU 2521530, C1) comprising a displacement pump and a downhole linear motor which includes the fixed part (stator) with the winding and the moving part inside (mover) designed so as to allow the mover to reciprocate with regard to stator, the motor cavity is vented, the motor housing is linked to the pump case, the mover is linked to the moving part of the pump through the rod, the stator has the cylindrical and end sealing elements for the stator; the motor cavity is vented through filter and linked with the pump cavity through the packing between the rod and housing, the motor stator has longitudinal through conduits between the external face of the winding and inner face of the motor housing which connect the cavities on either end sides of the stator.

This unit is characterized in that it may be equipped with the supplementary rod identical to the first one arranged on the other side of the mover and vented through additional packing in a housing, the filter is designed as a fine filter, the tubular members made of high thermal conductivity material may be arranged in longitudinal through conduits with the ends of tubular members tightly connected to the end packing elements of the stator.

The most similar engineering concept has a relatively poor reliability and low power performance.

The object of the present invention is to increase the reliability and improve the power performance of the unit by overcoming the above mentioned drawbacks of the previous engineering concepts.

SUMMARY OF THE INVENTION

The subject of the present invention is an oil-well pumping unit comprising a downhole part, the downhole part including a fully integrated plunger pump and a gravity gas separator, a downhole linear motor, a downhole telemetry unit fitted with stratum fluid temperature and pressure sensors, a vibration sensor, a drift log or inclinometer, and a ground-based part consisting of a control unit comprising a three-phase high-frequency inverting controller, an output transformer, all connected with the downhole linear motor via an insulated three-wire cable.

DETAILED DESCRIPTION OF THE PREFERRED EMBODIMENT

Figure 1:
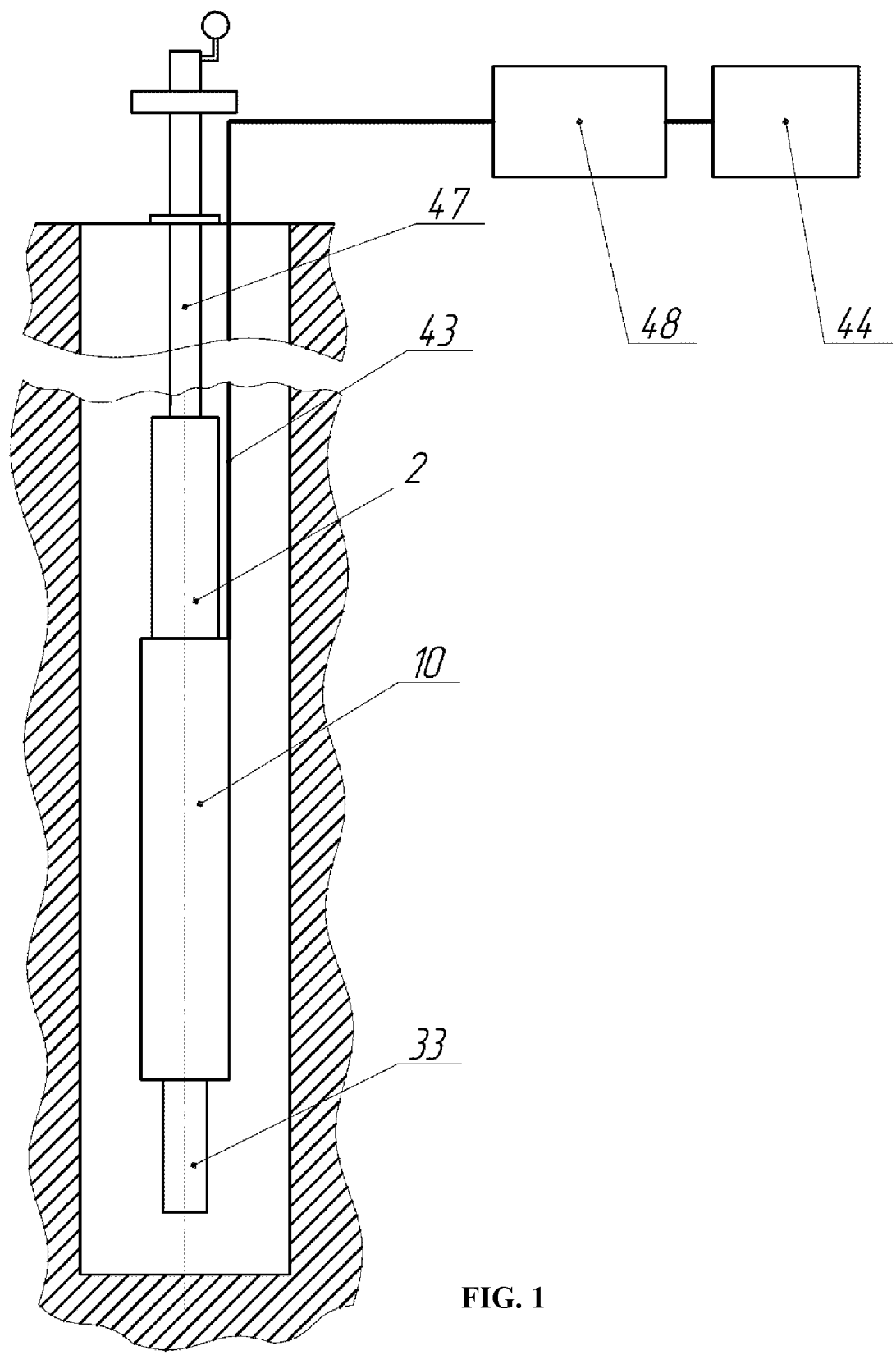
FIG. 1. Oil-well Pumping Unit
FIG. 2. Plunger Pump during (a) Upstroke and (b) Downstroke
FIG. 3. Downhole Linear Motor
FIG. 4. Magnets, Concentrators, Magnetic Field Lines
FIG. 5. Grease and Hard Lubricants
FIG. 6. Non-Return Valve, Cable Glands and Sensors
FIG. 7. Oil-well Pumping Unit. Electric Circuit Diagram

The other specifications and advantages of the present invention will be more evident based on the following explanatory description combined with the attached drawings.

The oil-well pumping unit comprises the plunger pump (2, FIG. 2), the plunger pump being fitted with discharge valves (3, FIG. 2), a non-return valve (4, FIG. 2), the non-return valve being connected to the pump discharge by a coupling (5, FIG. 2) for fastening of the oil-well pumping unit to the flow tubing (6), and a single housing (1) comprising a gravity gas separator. The pump may also be fitted with the filter (7, FIG. 2) for purifying the incoming fluid, a barrel (8, FIG. 2) a plunger (9, FIG. 2, and an additional plunger (48, FIG. 2), which is mounted in the additional cylinder cavity (49, FIG. 2).

Figure 4:
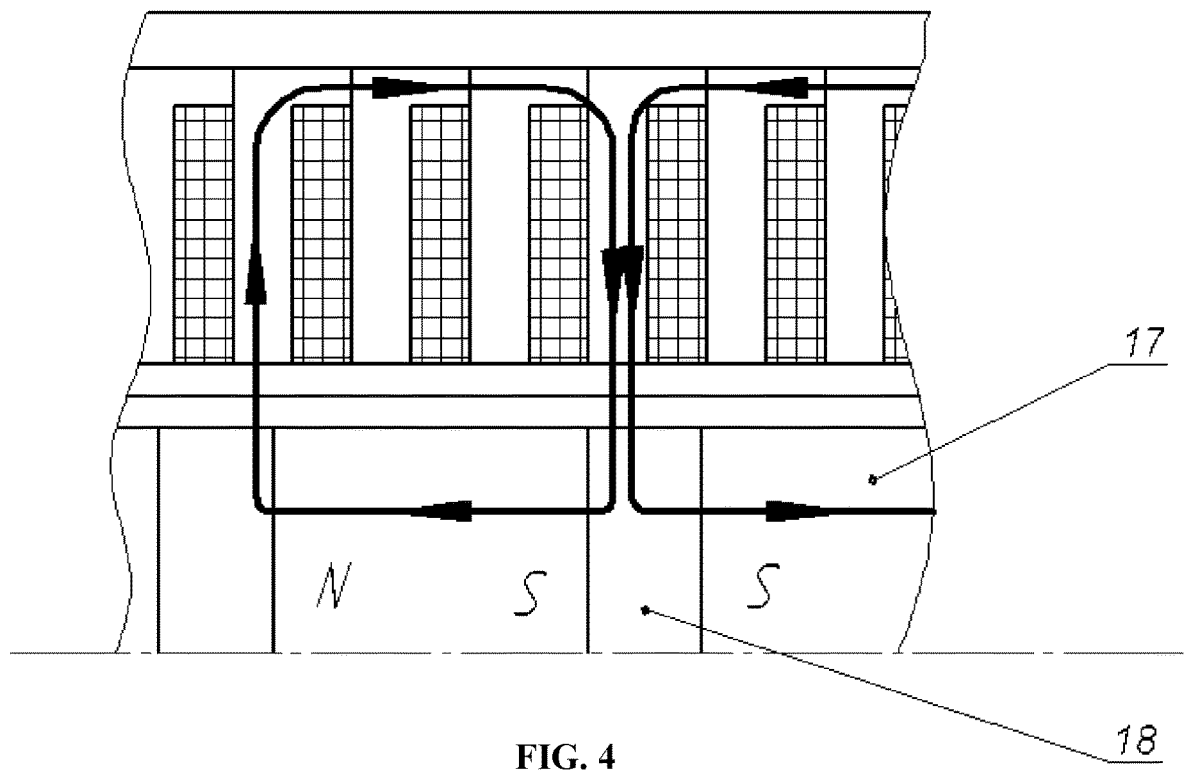
Figure 5:
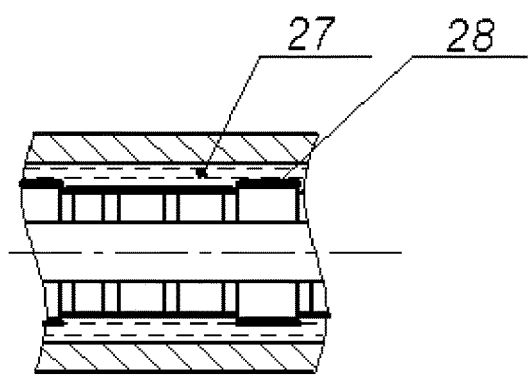

The oil-well pumping unit also comprises the downhole linear motor (10, FIG. 1), mounted below the plunger pump (2, FIG. 2). The downhole linear motor comprises a fixed part designed as a stator (11, FIG. 3), the stator having a three-phase winding as double-row sectional coils (12, FIG. 3) and laminated iron cores (13, FIG. 3), a stator bore (14, FIG. 3) designed as a single-part internally honed non-magnetic pipe, a slider cavity (53, FIG. 3), and a moving part inside the stator bore designed as a slider (15, FIG. 3), the slider comprising a non-magnetic axle (16, FIG. 3) with magnets (17, FIG. 3) and concentrators (18, FIG. 3) directing the magnetic lines of magnets radially as shown in FIG. 4. Additionally, the slider comprises non-magnetic bushes (19, FIG. 3), the non-magnetic bushes having a strength (i.e. hardness) less than that of the non-magnetic pipe. The slider is designed for reciprocation with respect to the stator. The stator is filled with high-dielectric fluid. The stator (11, FIG. 3) is vented through the hydroprotection cavity (20, FIG. 3) and diaphragm (21, FIG. 3) via a hydroprotection channel (55, FIG. 3). Temperature sensors (22, FIG. 3) are fitted in coils (12, FIG. 3). The stator is fitted with the dump valve (23, FIG. 3) to discharge dielectric fluid to the atmosphere. The motor cavity is vented through channels (54, FIG. 3) along the stator housing, a filter (24, FIG. 3), and one or more packings (25, FIG. 3), said packings being located at the top and bottom of the motor, said packing being fitted on a single-piece slide bush (26, FIG. 3). The slider cavity (53, FIG. 3) is filled with grease (27, FIG. 5) and hard (28, FIG. 5) lubricants. The slider (15, FIG. 3) is rigidly attached to the moving part of the plunger pump through the extension bar (29, FIG. 2), the extension bar being a metallic rod with bores for transferred fluid overflow.

The oil-well pumping unit also comprises a slider upstroke damper (30, FIG. 2) mounted below the plunger pump (2, FIG. 2), and a slider downstroke damper (31, FIG. 3) mounted between the downhole linear motor (10, FIG. 3) and its base (32, FIG. 3). Each damper mechanism may comprise, e.g., a coiled spring (52, FIGS. 2-3). The upstroke damper further comprises at least one first channel (50, FIG. 2) and an inner channel. The downstroke damper further comprises at least one second channel (51, FIG. 3).

Figure 6:
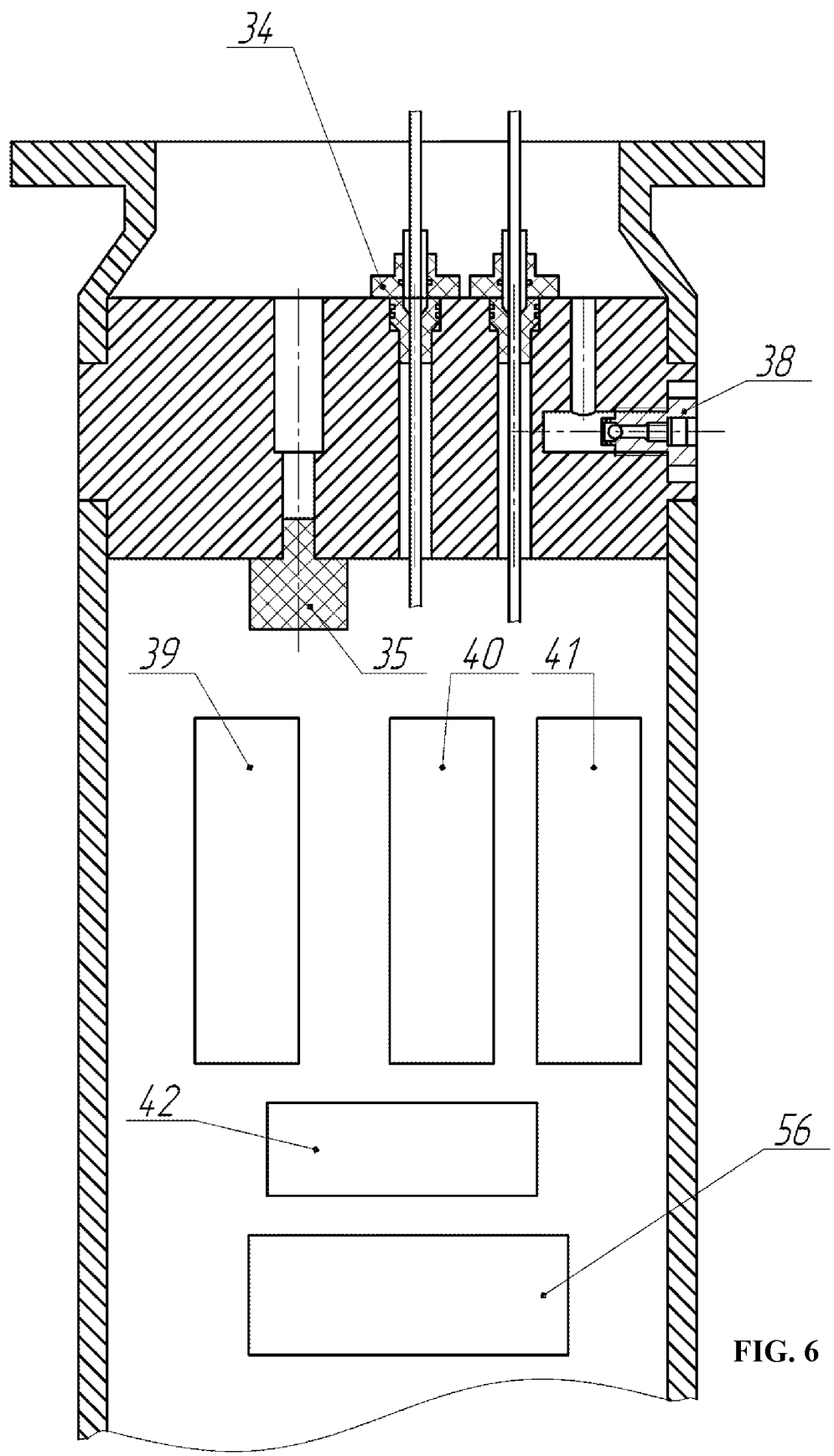
Figure 7:
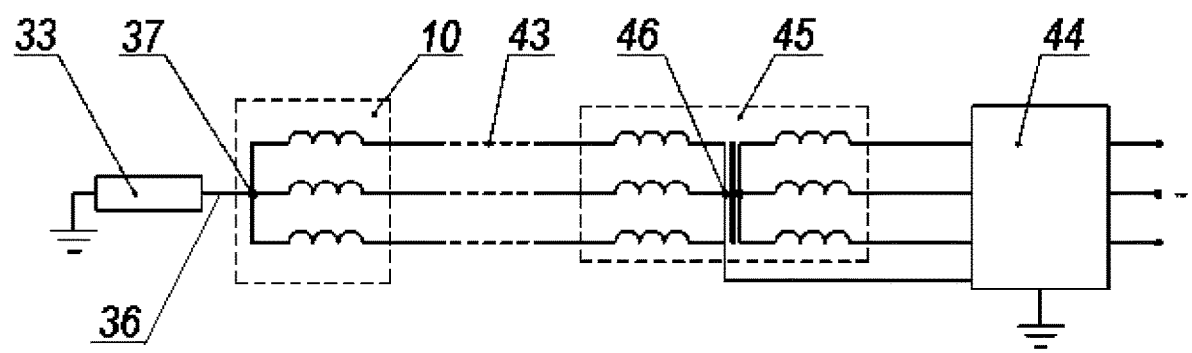

The oil-well pumping unit also comprises the telemetry system, which comprises a downhole telemetry unit (33, FIG. 3) mounted below the base of the downhole linear motor (32, FIG. 3), the downhole telemetry unit being connected to the stator cavity with small-section ducts and cable glands (34, FIG. 6) holding wires of temperature sensors (22, FIG. 3), oil pressure sensors inside the motor (35, FIG. 6), and neutral wires (36, FIG. 7) of windings of the downhole linear motor (10, FIG. 3). The downhole telemetry unit (33, FIG. 3) is also fitted with the filling valve (38, FIG. 6) and well fluid temperature (56, FIG. 6) and pressure sensors (39, FIG. 6), a vibration sensor (40, FIG. 6), a drift log or inclinometer (41, FIG. 6), a measurement unit (42, FIG. 6), all of which is also connected to the downhole linear motor via neutral point (37, FIG. 7). The downhole motor is fed from the ground-based control unit (44, FIG. 7) through a cable line comprising, e.g., an insulated three-wire cable (43, FIG. 7). The ground-based control unit comprises a telemetry control unit, an inverting rectifier, a measuring channel, and an output transformer (45, FIG. 7) providing for increased voltage. The downhole and ground-based units are connected through the neutral wire of windings (36, FIG. 7) of the downhole linear motor and the neutral wire (46, FIG. 7) of the output transformer secondary winding. The ground-based control unit (44, FIG. 7) is fed with three-phase AC voltage.

The operating principle of the oil-well pumping unit is as follows.

The ground-based control unit (44, FIG. 7) is fed with three-phase AC voltage. The ground-based control unit (44, FIG. 7) converts the power signal and supplies it to the downhole linear motor (10, FIG. 7) through the output transformer (45, FIG. 7) and cable line (43, FIG. 7).

The power signal causes the current to flow through sectional coils (12, FIG. 3) and this current generates the traveling magnetic field. The traveling magnetic field causes the slider (15, FIG. 3) to smoothly reciprocate up and down for the prescribed displacement. The slider (15, FIG. 3) is rigidly connected to the pump plunger using extension bar (29, FIG. 2) and additional plunger (48, FIG. 2), and the stator (11, FIG. 3) is rigidly connected to the housing (1, FIG. 2) of the plunger pump (2, FIG. 2).

During the downstroke, the discharge valve (3, FIG. 2) is opened and non-return valves (4, FIG. 2) are closed, and the cavity of the barrel (8, FIG. 2) is filled with the transferred fluid due to underpressure. During the upstroke, the discharge valve (3, FIG. 2) is closed, the downhole linear motor (10, FIG. 3) acts to pressurize the fluid within the barrel (8, FIG. 2) and non-return valves (4, FIG. 2) are opened, and the volume of fluid filled during the downstroke is pushed into the flow tubing (47, FIG. 1) and subsequently transferred to the surface as the flow tubing is filled.

The filter (7, FIG. 2) of the plunger pump may be designed with different degrees of purification of the transferred fluid in order to increase the pump life in case of high concentration of mechanical impurities.

Figure 2:
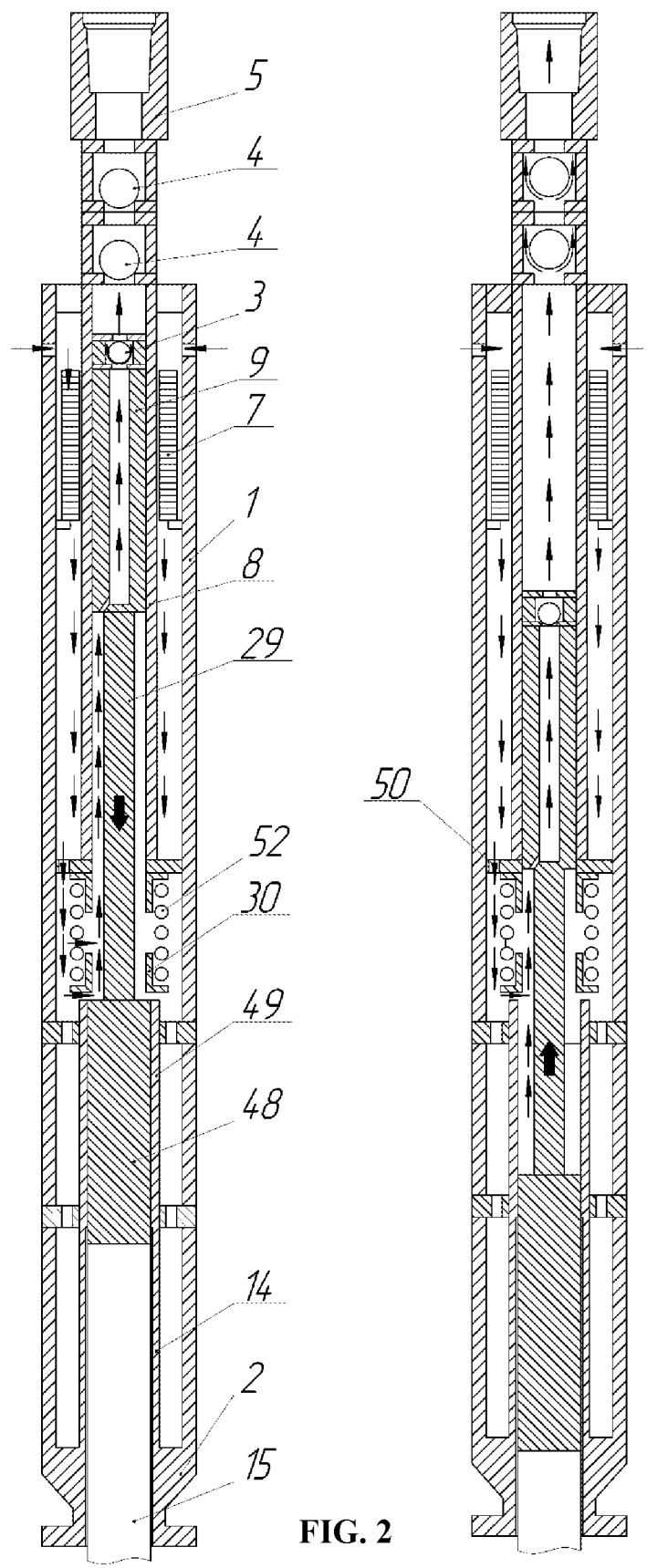
Figure 3:
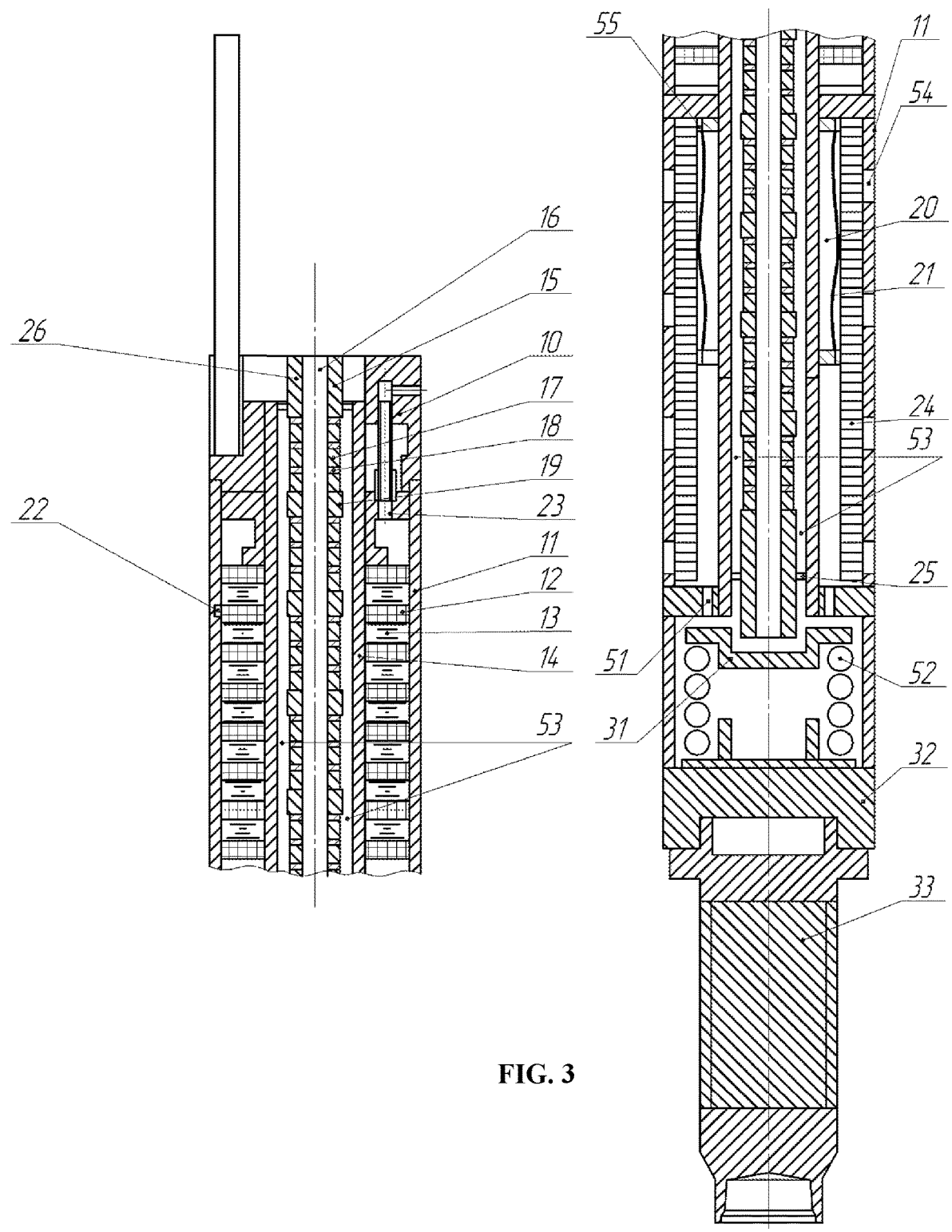

The filter (7, FIG. 2) of the plunger pump may be designed with different degrees of purification of the fluid entering the cavity of the downhole motor (10, FIG. 3) designed for compensation of the underpressure/pressure of the transferred fluid created during motion of the slider (15, FIG. 3).

The transferred fluid is drawn into plunger pump (2, FIG. 2) through the housing (1, FIG. 2) which is a gravity gas separator.

The ground-based control unit (44, FIG. 1) receives the oil-well fluid pressure and temperature parameters from the downhole telemetry unit (33, FIG. 1) to control the inflow of the transferred fluid and changes the operating mode of the downhole linear motor to maintain this production rate.

The ground-based control unit (44, FIG. 1) receives the temperatures of the downhole linear motor (10, FIG. 1) and oil-well fluid from the downhole telemetry unit (33, FIG. 1) to control operating temperature of the downhole part and changes the operating mode of the downhole motor to maintain its safe operating temperatures.

The ground-based control unit (44, FIG. 1) determines the position of the slider (15) and controls the operation of the downhole linear motor (10, FIG. 1) according to the cyclogram: the upstroke means the rated power consumption, the downstroke means the minimum power consumption.

The ground-based control unit (44, FIG. 1) receives the oil-well fluid pressure and temperature parameters from the downhole telemetry unit (33, FIG. 1) to control the inflow of the transferred fluid in the well and changes the operating mode of the downhole linear motor (10, FIG. 1) to maintain this production rate.

The ground-based control unit (44, FIG. 1) measures the EFM generated on the stator windings of the linear motor (10, FIG. 1) during motion of the slider (15, FIG. 1) and determines the position of the slider (15, FIG. 1).

The downhole motor has an increased life thanks to grease (27, FIG. 5) and hard (28, FIG. 5) lubricants and packing (25, FIG. 3).

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An oil-well pumping unit, comprising:
  a ground-based control unit comprising a channel for measuring a back-EMF generated by the oil well pumping unit,
  a downhole part connected to said ground-based control unit, said downhole part comprising:
    a plunger pump, said plunger pump comprising:
      discharge valves,
      a filter,
      a gravity gas separator,
      one or more non-return valves mounted above said gravity gas separator, and
      a coupling located above said one or more non-return valves, said coupling being adapted to connect a flow tubing,
    a slider upstroke damper, and
    a slider downstroke damper,
  a downhole linear motor connected to said plunger pump, said downhole linear motor comprising:
    a housing,
    a stator fixed relative to said housing, said stator comprising a three-phase winding and temperature sensors,
    said stator further comprising:
      an internal stator bore, said internal stator bore housing a reciprocating slider,
      a stator cavity filled with a dielectric fluid,
      a slider cavity filled with a lubricant,
      the reciprocating slider being rigidly connected to a moving part of the plunger pump via an extension bar, and
  a communicatively coupled downhole telemetry unit comprising at least one fluid temperature sensor, a pressure sensor, a vibration sensor, and an inclinometer,
  wherein said ground-based control unit further comprises an inverting rectifier, wherein said ground-based control unit is connected to said downhole linear motor via a neutral wire, said ground-based control unit being configured to receive said back-EMF generated in said three-phase winding, said ground-based control unit determining a position of the slider based on said back-EMF, said ground-based control unit signalling for and causing a reverse motion of the slider when the slider reaches a top or a bottom of said downhole linear motor.

2. The oil-well pumping unit of claim 1, wherein the downhole telemetry unit is connected to the ground-based control unit though a neutral wire, said neutral wire comprising star-connected windings, said star-connected windings being a part of the downhole linear motor.

3. The oil-well pumping unit of claim 1, wherein the ground-based control unit comprises a three-phase high-frequency inverting controller and output transformer, said ground-based control unit being connected to the downhole linear motor through an insulated three-wire cable.

4. The oil-well pumping unit of claim 1, further comprising a connecting plunger cylinder, said plunger cylinder configured to stabilize the slider and the plunger pump.

5. The oil-well pumping unit of claim 1, wherein the gravity gas separator is also a housing of the plunger pump.

6. The oil-well pumping unit of claim 1, wherein the stator bore comprises a single-piece non-magnetic pipe, said single-piece non-magnetic pipe contacting non-magnetic slider bushes of the slider, wherein the non-magnetic slider bushes comprise a material having a hardness less than a hardness of the single-piece non-magnetic pipe.

7. The oil-well pumping unit of claim 1, wherein the slider further comprises magnets and concentrators fixed on a non-magnetic axle of the oil-well pumping unit, said magnets and concentrators providing a concentration and a directivity of magnetic flux.

8. The oil-well pumping unit of claim 1, wherein the three-phase stator windings are double-row sectional coils, said three-phase stator windings having cores made of laminated iron.

9. The oil-well pumping unit of claim 1, further comprising slider outputs from a top and a bottom of the stator, each of said slider outputs comprising a single-piece slide bush and packing.

10. The oil-well pumping unit of claim 1, wherein the slider cavity further comprises:
    a small section channel interconnecting an inner cavity of the stator with a cavity of the downhole telemetry unit, and
    a hydroprotection cavity with a pressure vent diaphragm.

11. The oil-well pumping unit of claim 2, wherein the ground-based control unit further comprises one or more processors configured to:
    receive an oil-well fluid pressure and temperature parameters from the downhole telemetry unit to control an inflow of a transferred fluid in a well and change an operating mode of the downhole linear motor to maintain a production rate;
    receive the temperature parameters of the downhole linear motor and the oil-well fluid from the downhole telemetry unit to control operating temperature of a downhole part and change the operating mode of the downhole linear motor to maintain safe operating temperatures; and
    determine a position of a slider and control the operation of the downhole linear motor according to a cyclogram based on power consumption.

* * * * *